United States Patent [19]

Bedo et al.

[11] 3,796,228
[45] Mar. 12, 1974

[54] RELIEF VALVE

[76] Inventors: Alfred Bedo, 7225 Spanghurst Dr., Walton Hills, Ohio 44146; Edward Beck, 1384 S. Taylor St., Cleveland Heights, Ohio 44118

[22] Filed: Aug. 25, 1972

[21] Appl. No.: 283,969

Related U.S. Application Data

[63] Continuation of Ser. No. 153,904, June 15, 1971, abandoned.

[52] U.S. Cl............ 137/536, 137/543.13, 251/368
[51] Int. Cl............................................ F16k 15/06
[58] Field of Search ...... 137/540, 542, 543.13, 535, 137/536, 538; 251/368

[56] References Cited
UNITED STATES PATENTS

| | | | |
|---|---|---|---|
| 2,321,679 | 6/1943 | Houston | 137/542 X |
| 2,292,294 | 8/1942 | Rotter et al. | 137/542 X |
| 3,236,496 | 2/1966 | Rosenstein et al. | 251/368 X |
| 2,874,718 | 2/1959 | Kelly | 137/543.13 X |
| 3,044,743 | 7/1962 | Siegel | 137/543.13 X |
| 3,200,839 | 8/1965 | Gallagher | 137/536 X |
| 3,272,218 | 9/1966 | Johnson | 137/540 X |
| 3,438,391 | 4/1969 | Yocum | 137/536 X |
| 3,605,793 | 9/1971 | Kinsel | 137/543.13 X |

*Primary Examiner*—William R. Cline
*Attorney, Agent, or Firm*—Fay, Sharpe and Mulholland

[57] ABSTRACT

The specification and drawings disclose a relief valve which is particularly suited for high pressure use. The disclosed valve includes a housing with a longitudinal inlet passage and a laterally extending discharge passage. The inlet passage is counterbored to a larger diameter inwardly of one end to a point slightly past the intersection of the outlet passage. The shoulder formed at the end of the counterbore defines a seat which cooperates with a cylindrical valve member slidingly received in the counterbore. The end of the valve which engages the seat is conical and the other end has a reduced diameter portion which serves as a guide stem. A guide member slidably receives the guide stem and is adjustably connected to the housing. A compression spring is positioned about the guide stem between the valve member and the underside of the guide member. In the embodiment shown, the guide member is connected to the housing by a bonnet nut so that by adjusting the bonnet nut, the spring pressure can be varied to vary the valve setting.

8 Claims, 3 Drawing Figures

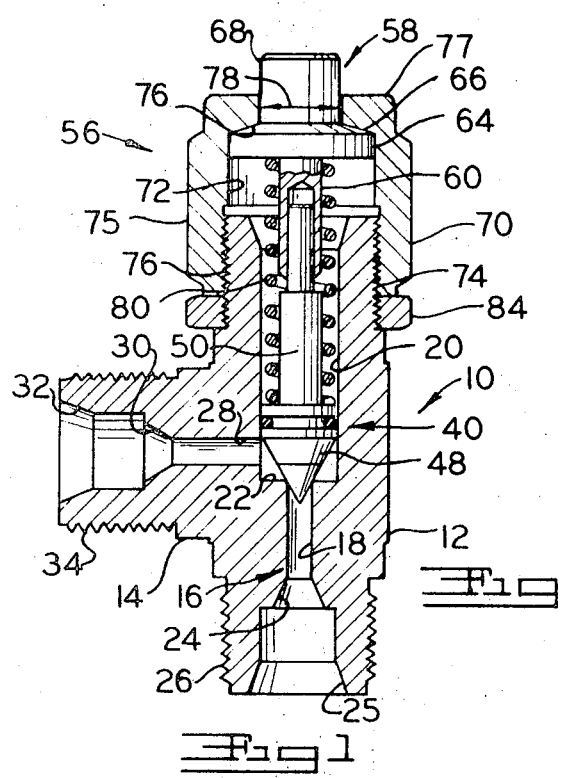
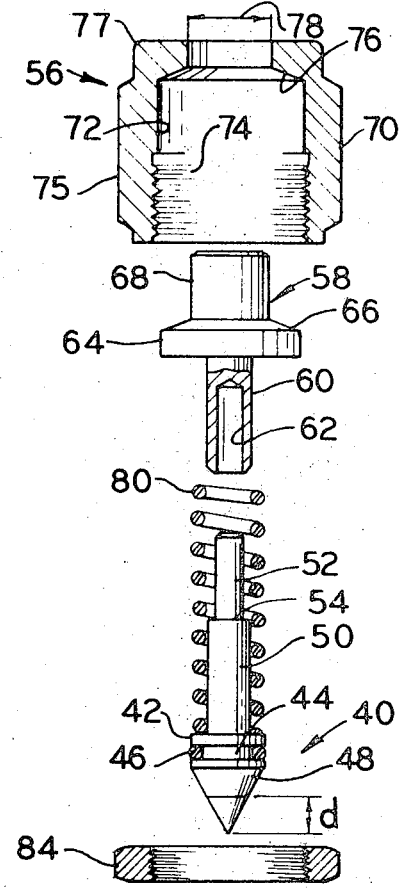
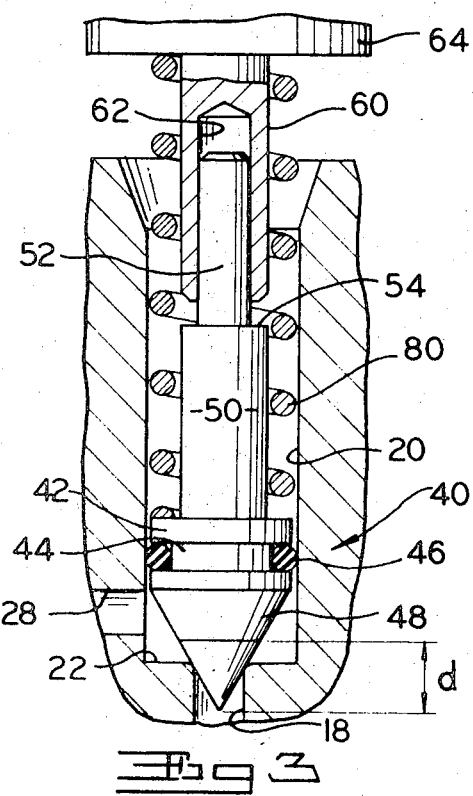
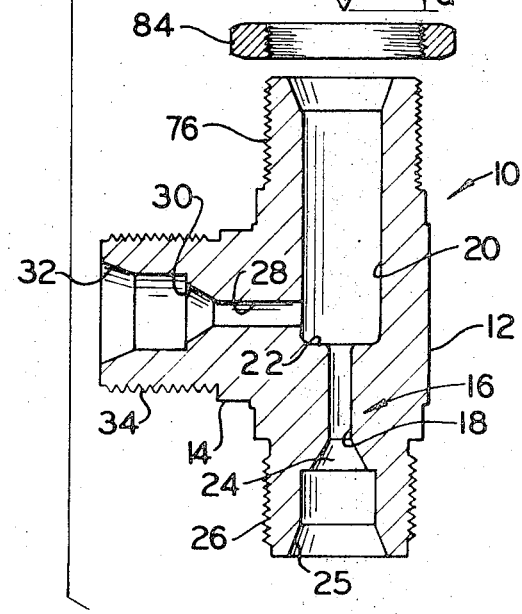

RELIEF VALVE

The subject application is a continuation of application Ser. No. 153,904, filed June 15, 1971, and now abandoned.

The subject invention is directed toward the valve art and, more particularly, to an improved relief valve.

The invention is especially suited for small, high pressure relief valves and will be described with particular reference thereto; however, as will be apparent, the invention can be embodied in relief valves of many sizes or pressure ranges.

The invention has for its primary object the provision of an extremely simple and highly reliable relief valve which can be easily adjusted to desired opening pressures. The valve is arranged so that the control spring can be readily changed for large changes in operating pressure, or, the compression of the spring can be adjusted for smaller changes. The internal assembly of the valve is such that the control spring is never contacted by the fluid within the valve. Further, all of the guide and adjusting surfaces are sealed from the controlled fluid.

In particular, the invention contemplates a relief valve including a housing having a first passage formed longitudinally therethrough. A second passage extends laterally into the housing into flow relationship with the first passage. The first passage is counterbored to a larger diameter inwardly from one end to a point slightly past the intersection of the second passage. The juncture between the counterbored portion and the remainder of the passageway defines an annular shoulder which serves as a seat. Slidably carried within the counterbored portion of the first passage is a valve member having a cylindrical body closely received in the counterbore. The end of the body facing the annular shoulder has a portion adapted to sealingly engage the seat. At the opposite end of the body and concentric therewith is a reduced diameter portion including a guide stem. A guide member having a portion which slidably receives the guide stem is adjustably connected to the housing. Positioned between the cylindrical body and the guide member and surrounding the guide stem is a compression spring which maintains the cylindrical body continually biased toward the shoulder. Preferably, the guide member is connected to the housing by a bonnet nut which is threadedly attached to the housing. Thus, by adjusting the bonnet nut, the spring pressure can be varied to adjust the valve setting. Alternately, the bonnet nut can be removed and a different strength spring rapidly installed.

A more limited aspect of the invention contemplates that the portion of the cylindrical body which engages the shoulder is conical and that a seal ring is carried about the cylindrical body at a location spaced from the lateral passage. Preferably, the conical end has a length greater than the distance between the shoulder and the lateral passage. The lateral passage is thus completely open at all times so that full exhaust flow can take place with only a slight opening of the valve.

The invention also contemplates that the stem guide will preferably be freely rotatable in the bonnet nut. This allows the bonnet nut to be adjusted on the housing for pressure setting variation without rotating the valve member against the seat. Thus, the seat and valve cannot be scored during adjustment or while the valve is in use.

Accordingly, a primary object of the invention is the provision of a simple, relief valve which is suitable for high pressure use and which is easily adjusted for varying pressure ranges.

Another object of the invention is the provision of a relief valve assembly which requires a minimum number of components and is highly reliable.

A still further object of the invention is the provision of a relief valve which can be easily adjusted without possibility of damage to the valve element or the seat.

A still further object is the provision of a valve of the type described which can be easily manufactured in a variety of sizes and pressure ranges.

The above and other objects and advantages will become apparent from the following description when read in conjunction with the accompanying drawings wherein:

FIG. 1 is a longitudinal cross-sectional view through a preferred embodiment of the invention;

FIG. 2 is an exploded cross-sectional view similar to FIG. 1 but showing the components in a disassembled relationship; and, FIG. 3 is an enlarged view of the valve and stem guide portions of the assembly.

Referring in particular to FIG. 1, it will be noted that the preferred embodiment of the invention comprises a housing 10 having a generally cylindrical longitudinal portion 12 and a laterally extending cylindrical portion 14. The housing can be formed from any suitable material capable of withstanding the pressures and the particular type of fluid which is to be handled. Further, the housing can be formed from a forging, bar stock, or the like.

Extending axially through the longitudinal housing portion 12 is a passageway 16 which includes a first flow passage 18 and an enlarged counterbored passage 20. A shoulder 22 formed at the juncture between passages 18 and 20 defines a valve seat 22. It should be appreciated that the seat 22 is shown merely as a rounded edge on the metal at the juncture between the two passages; however, various types of resilient inserts or the like could be used for the seat if desired.

The outer end of passage 18 is shown formed with a tapered mouth 24 and a tapered end 25 which are adapted to receive the end of a fluid pipe and swage rings. The outer periphery of the lower end portion of the housing section 12 is threaded as shown at 26 to receive a coupling nut or the like. Other types of connecting arrangements such as flanges could be provided on the end of section 12 for attachment of the necessary fluid lines.

The laterally extending section 14 is provided with an axially located flow passage 28 which extends inwardly into the lower end of the counterbored passage 20. The outer end of passage 28 is provided with a tapered mouth 30 and a tapered end 32 which allow a discharge line to be connected to the outlet of the valve with relatively standard swage-type fittings. Note that the outer circumference of the portion 14 is provided with threads 34.

The portion of the valve thus far described is not of particular importance and could vary substantially. As previously mentioned, the particular manner in which the housing is formed and the type of connecting assemblies used on the inlet and outlet ends could be changed as desired.

Referring more particularly to FIGS. 2 and 3, the arrangement of the valving element and the manner in which the pressure setting can be changed will now be described. As shown, the valve element 40 comprises a generally cylindrical center section 42 which has an outer diameter only slightly smaller than the diameter of the counterbore 20. A circumferential groove or recess 44 is formed about portion 42 and an O-ring or the like 46 is received within the groove to provide a sliding seal between the cylindrical portion 42 and the inner wall of counterbore 20. Extending downwardly (as viewed in FIGS. 2 and 3) from the cylindrical portion 42 is a conical section 48. Preferably, section 48 is of a length and angle such that when the element is in the closed position shown in FIGS. 1 and 3, the cylindrical section 42 does not extend over the inner end of passage 28. In the embodiment under consideration, the conical section 48 is provided with a coating of Teflon or the like throughout its lower end for a distance d. This provides a good, non-galling wear and sealing surface for the valve member. It should be appreciated however, that the particular type of coating applied could vary and, in many instances, could be dispensed with entirely.

Extending axially upward from the top surface of section 42 is a somewhat reduced diameter stem section 50. A smaller guide stem portion 52 extends axially upward from the upper end of section 50. It will be noted that a shoulder 54 at the juncture between sections 50 and 52 provides a stop for the upper limit of movement of the valve element in a manner subsequently to be described. As can be appreciated, the particular materials from which the valve member is formed can vary depending upon the service requirements for the valve. However, in the subject embodiment, the valve housing and the valve member are formed from stainless steel.

The valve element is guided for reciprocation in the counterbore 20 by a stem guide and coupling nut assembly 56. Assembly 56 includes a stem guide member 58 comprising a cylindrical, downwardly extending guide portion 60 having an internal bore 62 adapted to slidably receive guide stem 52. An enlarged diameter section 64 is formed axially on the upper end of the cylindrical portion 60 and includes an inclined upper wall 66. A cylindrical portion 68 extends upwardly from section 64.

The stem guide member 58 is connected to the housing 10 in a manner which permits it to be adjusted in a vertical direction. In the embodiment under consideration, the connection is made by a bonnet nut member 70 which has an internal opening 72 of a diameter slightly greater than the outer diameter of section 64 of the stem guide. The bonnet nut 70 is threaded at 74 and connects with external threads 76 formed on the upper end of the longitudinal section 12 of the housing 10. The outer surface of the bonnet nut 70 is provided with wrench flats 75 which facilitate adjusting.

The inner end of the opening 72 is provided with an inwardly extending flange 77 having a tapered inner face 76 which engages the tapered wall 66 on the stem guide 58. Preferably, the wall 76 and the face 66 are relatively smooth so that they allow free rotation to take place between the stem guide and the bonnet nut. The inner diameter 78 of the flange 74 is preferably sized so as to closely receive the section 68 of the stem guide.

As shown, a compression spring 80 is positioned between the enlarged portion 64 of the stem guide and the cylindrical portion 42 of the valve member 40. The spring has an outer diameter slightly less than the diameter of counterbore 20 so that it is freely movable within the bore 20. Similarly, the inner diameter of the spring 80 is only slightly greater than the section 50 of the valve stem and section 60 of the stem guide.

The pressure relief setting for the valve can be adjusted by varying the strength of the spring 80. Because of the arrangement of the bonnet nut and the stem guide, access to the spring can be easily had for changing or the like. Alternately, the pressure relief setting of the valve can be varied by adjusting the position of the bonnet nut 74 to vary the compression on spring 80. To lock the bonnet nut in an adjusted position, there is provided a lock nut 84 which is merely tightened against the lower edge of the bonnet nut 74. Releasing the lock nut allows the bonnet nut to be adjusted to substantially any desired setting within the spring capacity.

One feature of the assembly which should be noted is that the guide stem, the stem guide and the spring are completely isolated from the fluid passing through the valve. Additionally, they are located and mounted for easy access for changing or the like.

The invention has been described in great detail sufficient to enable one of ordinary skill in the valve art to make and use the same. Obviously, modifications and alterations of the preferred embodiment will occur to others upon a reading and understanding of the specification and it is our intention to include all such modifications and alterations as part of our invention insofar as they come within the scope of the appended claims.

What is claimed is:

1. A relief valve comprising:

a housing having a first passage formed longitudinally therethrough and a second passage extending laterally into the housing into flow relationship with the first passage, said first passage being counterbored to a larger diameter inwardly from one end to a point slightly past the intersection of the second passage to define an internal valve chamber, a juncture between the counterbored portion and the remainder of the first passage defining an annular shoulder which serves as a valve seat;

a valve member slidably carried within the counterbored portion of the first passage and having a cylindrical body closely received in the counterbore and having a circumferential groove which carries a seal ring, the end of the body facing said annular shoulder having a portion adapted to sealingly engage the seat, the opposite end of said body having a reduced diameter portion concentric with the body and including a guide stem;

a guide member including a bore which slidably receives the guide stem positioned over the counterbored end of said passage, said guide stem having an end portion terminating within said guide member and enclosed thereby;

a compression spring positioned between the cylindrical body and the guide member and surrounding the guide stem for maintaining the cylindrical body continually biased toward the shoulder; and, a bonnet nut member rotatably receiving the guide member and threadedly connected to said housing whereby adjustment of the bonnet nut member varies the compression on said spring.

2. The invention as defined in claim 1 wherein said seal ring is carried at a location spaced from said lateral passage when said valve member is in engagement with said seat.

3. The invention as defined in claim 1 wherein said guide member is freely rotatable within said bonnet nut and wherein said guide stem is freely rotatable in the bore in said guide member.

4. The valve as defined in claim 3 wherein said guide member includes a tapered shoulder which engages a corresponding tapered shoulder in said bonnet nut.

5. The invention as defined in claim 4 wherein means are provided for locking said bonnet nut in a desired position on said housing.

6. The invention as defined in claim 5 wherein said guide member includes a portion which extends outward through said bonnet nut.

7. The valve as defined in claim 1 wherein the lower end of said cylindrical body includes a conically shaped tip adapted to engage said seat, said tip having a coating of resilient material on the end thereof.

8. A relief valve comprising:
   a housing having a first passage formed longitudinally therethrough and a second passage extending laterally into the housing into flow relationship with the first passage, said first passage extending past the intersection of the second passage to define an internal valve chamber, a seat in said valve chamber;

a valve member slidably carried within the counterbored portion of the first passage and having a cylindrical body closely received in the counterbore and having a circumferential groove which carries a seal ring, the end of the body facing said annular shoulder having a portion adapted to sealingly engage the seat, the opposite end of said body having a reduced diameter portion concentric with the body and including a guide stem;

a guide member including a bore which slidably receives the guide stem positioned over the counterbored end of said passage, said guide stem having an end portion terminating within said guide member and enclosed thereby;

a compression spring positioned between the cylindrical body and the guide member and surrounding the guide stem for maintaining the cylindrical body continually biased toward the shoulder; and, a bonnet nut member rotatably receiving the guide member and threadedly connected to said housing whereby adjustment of the bonnet nut member varies the compression on said spring.

* * * * *